United States Patent [19]

Kiss

[11] 4,439,477
[45] Mar. 27, 1984

[54] FIBER MAT FOR PRODUCING A THREE DIMENSIONAL MOLDED MOLDING BY THE DRY PROCESS

[75] Inventor: Günter H. Kiss, Berlin, Fed. Rep. of Germany

[73] Assignee: Lignotock Verfahrenstechnik GmbH, Fed. Rep. of Germany

[21] Appl. No.: 450,924

[22] Filed: Dec. 20, 1982

Related U.S. Application Data

[63] Continuation-in-part of Ser. No. 202,316, Oct. 30, 1980, abandoned.

[51] Int. Cl.³ ................................................. B32B 3/06
[52] U.S. Cl. ..................................... 428/102; 428/131; 428/138; 428/152; 428/153; 428/154; 428/181; 428/195; 428/209; 428/211; 428/246; 428/248; 428/284; 428/285; 428/286; 428/300; 428/326; 428/234; 428/457
[58] Field of Search ............... 428/152, 153, 154, 176, 428/179, 181, 184, 131, 137, 138, 198, 209, 211, 246, 248, 300, 326, 369, 370, 195, 102

[56] References Cited

U.S. PATENT DOCUMENTS

| | | | |
|---|---|---|---|
| 3,597,299 | 8/1971 | Thomas | 161/57 |
| 3,650,882 | 3/1972 | Thomas | 161/122 |
| 3,674,619 | 7/1972 | Scher | 161/119 |
| 3,879,257 | 4/1975 | Gentile et al. | 428/152 |
| 3,953,638 | 4/1976 | Hemp | 428/298 |
| 3,961,119 | 6/1976 | Thomas | 428/178 |
| 4,198,480 | 4/1980 | Kiss | 428/284 |
| 4,239,792 | 12/1980 | Ludwa | 428/198 |

*Primary Examiner*—James J. Bell
*Attorney, Agent, or Firm*—Basile, Weintraub & Hanlon

[57] ABSTRACT

A fiber mat for producing a three-dimensional molded molding by the dry process. The fiber mat includes a prestrengthened layer containing cellulose fibers and deformable supporting layers with which the fibrous layer is joined. The fibrous layer is arranged as the central layer between two supporting layers. The supporting layers are formed of creped, low-extension foil material and are joined to the central layer surfaces while maintaining the pulling out properties of the creping.

18 Claims, No Drawings

FIBER MAT FOR PRODUCING A THREE DIMENSIONAL MOLDED MOLDING BY THE DRY PROCESS

CROSS REFERENCE TO CO-PENDING APPLICATION

This application is a continuation-in-part of application of application Ser. No. 202,316, filed Oct. 30, 1980 now abandoned in the name of Gunter H. Kiss and entitled: "A FIBER MAT FOR PRODUCING A THREE DIMENSIONAL MOLDED MOLDING BY THE DRY PROCESS"

BACKGROUND OF THE INVENTION

1. Field of the Invention

The invention relates to a fiber mat for producing a three-dimensional, molded molding by the dry process.

2. Description of the Prior Art

The production of three-dimensional molded moldings from lignocellulose fibrous materials by loosely sprinkling onto an endless conveyor belt the fibers wetted with small quantities of binder levelling the height for the fiber layer applied by a pairing roller and subsequently prestrengthening the fiber layer between pairs of rollers is known. This process leads to a sheet-like endless extrudate which can be cut into individual sheets from which flat blanks are produced following intermediate transport. Following vapor coating of the blanks, they are placed in a compression mold and are formed into the final molded articles, accompanied by the curing of the binder (DAS No. 1,224,949). The individual sheets cut in this way initially have a low deformability and limited breaking strength. Following the vapor coating necessary to increase the deformability for producing the three-dimensional molded molding articles, the sheets no longer have a significant internal cohesion and must therefore be very carefully treated and transported. Due to their limited fiber cohesion in the steam-treated state, they can only be further shaped to a limited extend without causing thinning of the material areas tensile stressed during molding, with the accompanying loss of fiber cohesion and the tearing of the mat.

To obviate this problem, it is known (DOS No. 1,453,416) to apply to the fiber mat a reinforcing fabric which can be deformed by stretching and which is pressed into the fiber layer by the rollers used for prestrengthening the mat. Here again, the bond between the reinforcing fabric and the fiber mat is largely lost through the vapor treatment necessary prior to the final shaping. Thus, during the molding process considerable relative movements occur between the individual fibers, which can bring about the tearing of the fiber mat.

German Pat. No. 2,364,025 also discloses a fiber mat comprising two lignocellulose fibrous layers between which is placed in firmly adhering manner on a supporting layer. The pre-molded fiber mat has a plurality of regularly distributed zones of limited cross-section. This improves the adhesion of the supporting layer during vapor treatment, so that the tensile stresses occurring during molding can be better distributed in the mat. In addition, such a mat extrudate can be wound onto a reel following prestrengthening, which facilitates handling and transportation.

In order to permit the manufacture of particularly thin-walled, three-dimensional molded moldings, such as are required for the internal lining of motor vehicle interiors, a process is used (German Pat. No. 2,338,650) in which the fiber mat is gradually molded in a mold equipped with a plurality of force plugs which can be operated in time sequence. This gradual molding is necessary to prevent tearing of the fiber mat. In this process, the fiber mat is gradually fed to the deformation points without any tearing of the fibers. This known process used in the three-dimensional shaping of thin-walled moldings requires especially careful application due to the sensitivity of the fiber mats. It also requires a large amount of time due to the gradual, succesive molding.

A further disadvantage of the known process is that the fiber mats must be made from top-quality wood fiber materials if they are to have satisfactory deformation characteristics, particularly in connection with the necessary small wall thickness of the moldings. It is impossible to pass below a lower fiber length limit if the tearing of the fiber mat is to be avoided during deformation. It is therefore impossible to use shorter fibers, such as are obtained in the preparation of waste materials, for example waste paper, although the waste materials have completely satisfactory material characteristics, particularly in the case of the admixture of longer length fibers.

The problem of the invention is to obviate the disadvantages inherent in the known fiber mats and their manufacturing processes in such a way that a fiber mat is obtained which, in the manner of a deep drawing process, can be immediately molded to a thin-walled molding without the hitherto necessary gradual molding procedure. Furthermore, through the addition of short-fiber waste material a higher strength, molded article with a smaller wall thickness can be obtained.

SUMMARY OF THE INVENTION

There is disclosed herein a fiber mat for producing a three-dimensional molded molding by the dry process. The fiber mat includes a prestrengthened layer containing cellulose fibers and deformable supporting layers with which the fibrous layer is joined. The fibrous layer is arranged as the central layer between two supporting layers. The supporting layers are formed of creped, low-extension foil material and are joined to the central layer surfaces while maintaining the pulling out properties of the creping.

In the case of a fiber mat constructed according to the preamble of the main claim, the problem of prior fiber mats and their processing processes can be solved by the characteristic features thereof.

Advantageous further developments of the invention according to the main claim can be gathered from the subclaims.

DESCRIPTION OF THE PREFERRED EMBODIMENTS

The term "creping" is understood to mean all shaping processes to the supporting layer which increase the surface area thereof without stretching or extending the actual material when it is pulled out in at least one direction. Such shapes can be in the form of parallel folds such as pleats. This is advantageous if a substantially groove-like, three-dimensional shaping is desired. In the case of cup-shaped shaping, crossing folds are recommended. The term "creping" also covers, for example, circular folds or impressions and, in the case of fabrics, those yarns which are crimped or overtwisted.

The fiber mat of the present invention is suited for producing a three-dimensional molded molding by means of the dry process for use as the internal lining of motor vehicles, for example. The fiber mat comprises a prestrengthened layer containing cellulose or lignocellulose fibers and deformable supporting layers with which the fibrous layer is joined. The fibrous layer is arranged as the central layer between two supporting layers. The supporting layers are formed of creped, low-extension or extension-proof foil material, for example, paper, plastic, metal fabric and the like, joined to the central layer surfaces while maintaining the pulling out properties of the creping.

The advantage of the mats according to the invention is initially that the fiber layer no longer comes into contact with the mold members. Thus, the sliding characteristics of the mats made according to the invention during molding are improved in the same way as the separation characteristics after molding. This improves the surface properties of the finished parts. In addition, during the mold closing process, the fibrous layer can be thermally insulated from the mold surfaces, so that there is no premature curing of the fibrous layer surfaces. This improves the strength characteristics of the fibrous layer.

The two-sided covering of the fibrous layer with supporting layers increases the effective interface between the fibrous layer and the supporting layer. This in itself considerably improves the reaction of the favorable deformation behavior of the supporting layers on the fibrous layer. An additional important advantage is provided in this connection by the creping of the supporting layers according to the invention. In prior art, elastically deformable supporting layers, can be extended up to failure, i.e., they cover the surface requirement necessary for three-dimensional deformation and become thin during deformation. Within the scope of their elasticity, they are initially randomly extensible, the extension being distributed in an uncontrolled manner over the entire surface area. Since it is necessary to avoid local extensions in the fibrous material which are greater than the covering or overlapping length of the fibers, the cooperation between the prior art elastic supporting layers and the fibrous layer means that the local extensibility of the fibrous layer can be exhausted. This consideration reduced the possibility of shaping fiber mats with supporting layers according to the prior art. As opposed to this, creped supporting layers have the surface reserve necessary for shaping within the actual creping and need not cover it by a thickness loss. If the surface reserve of the creping is locally used up, tensile stresses are subsequently transferred into the adjacent areas and their surface reserve is also utilized. The shape and intensity of the creping can be selected in the way that the local extensibility necessary for shaping is ensured and the local extensibility of the supporting layer can be adapted to the covering length of the fibers.

The form and intensity of the creping and the overlapping length of the fibers in the central layer are adjusted with respect to each other such that local elongation of the creping does not interrupt the central layer. The elastic supporting layers, when creped, should exhibit no more than 50% elongation. Furthermore, the form of geometry or the creping is designed in such a manner that the elongation of the creping and the supporting layers corresponds with one-half of the length of the fibers in the central layer. This prevents a local failure of the fibrous layer. The large surface area of the supporting layers in the creped state also aids the force transfer to the interface between the fibrous layer and the supporting layer. Thus, a mat is formed which is able during deformation to transfer significant tensile stresses, even in the outer area, without the local failure of the fibrous layer.

The reduction of the stretching proportion in the overall mat deformation means a more uniform thickness distribution in the finished article. This gives the particularly advantageous possibility of producing members, whose wall thickness is much less than that of the hitherto produced members. In the prior art, a finished article thickness of approximately 2 mm is considered to be the lower limit of what is technically possible. By means of the mats according to the invention, it is possible to produce finished products with a satisfactory quality and wall thicknesses of only approximately 1 mm.

As the increase in the surface area of creped supporting layers only requires limited forces during molding, it is possible to use higher strength supporting layers for the mats according to the invention. The molded article then has a sandwich structure comprising a medium-strength core and high-strength covering layers. The resulting improvements in strength and rigidity of the finished products allow the products to be produced with thinner walls at advantageous savings in cost and material over the prior art while providing the same use characteristics.

The two-sided covering of the fiber mat with closed supporting layers also reduces the risk of damage to the mats during transportation and handling.

This is particularly important if thin-walled finished articles are sought, so that the fiber mats would have only a limited thickness and consequently limited inherent stability. The two-sided supporting layer in particular considerably reduces the fracture risk of thin fiber mats during transportation.

The advantageous possibility of reducing by about a half the wall thickness of the finished articles through the use of the mats according to the invention will now be described again in general terms.

Quite apart from the weight and material saving of 50% the necessary overall molding time is reduced to approximately half. The molding time when molding wood fiber materials is mainly due to the inadequate thermal conductivity of this material group. A thickness reduction means a corresponding faster thorough heating (in practice this means fixed molding times/millimeter of material). This makes it possible to increase the utilization rate of the investment-intensive large compression presses which can be increased in the same proportion as the number of necessary cost-intensive molds can be reduced. Thus, considerable rationalization can be obtained with the mats according to the invention.

The punctiform or linear, fixed joining of the supporting layers to one another at preferably regular intervals in accordance with the invention additionally improves the overall characteristics of the mat. This brings about a reciprocal limitation of the fibrous layer areas, which can only be internally displaced but are reciprocally fixed on a larger area basis. This obviates the risk of larger area displacements of the fibrous mats during the molding process, so that during the deformation of the mat a more uniform material distribution is achieved. This effect is roughly comparable with the behavior of modern punctiform or linear quilted eiderdowns where a uniform distribution of the filling is still ensured if the eiderdown is shaken or rolled up.

According to an advantageous further development of the invention, the supporting layer creping is a cross-creping. This leads to an improved deformability of these layers.

It may also be advantageous if the supporting layers are perforated (e.g. by needling). The perforation makes the supporting layers gas-permeable, so that the mats according to the invention can easily be thermally treated, e.g. with steam. The gas permeability resulting from the perforation also aids the extraction of moisture from the mat during molding.

As the deformation characteristics of the supporting layers need no longer be provided by the actual material but can instead result from the creping, all crepable materials can be used for the supporting layers for the mats according to the invention.

Creped fabric made from natural or synthetic fibers can be used in the same way as creped plastic foils. Supporting layers of creped metal foils are also possible, particularly if the finished article must have a maximum resistance to moisture action. Supporting layers made from creped paper can be used with particular advantage, because this material can be inexpensively obtained and is easily processed. Fiber mats according to the invention can also have creped supporting layers made from different materials on the top and bottom of the mat. This makes it possible, e.g., to provide the visible side of the finished article with a supporting layer selected on the basis of decorative standpoints, while the supporting layer used on the side which is not visible is selected only on the basis of cost standpoints.

If impregnatable supporting layers are used it can be particularly advantageous for them to contain a thermosetting, duroplastic resin. Also they can, for example, be preimpregnated with phenolic or melamine resins. Thus, during hot molding, a high-finish, high-strength surface layer is obtained giving the finished article sandwich characteristics. This is particularly advantageous when molding thin-walled articles.

Unlike the prior art used as a basis for the invention where the supporting layers used firmly adhere by their entire surface area to the fibrous layer, it is not always necessary for the mats according to the invention to have a whole-area, firm adherence with the supporting layers.

As a result of the punctiform or linear interconnection of the supporting layers, areas are formed in which the fibrous layer is adequately fixed between the supporting layers. For special shaping problems, such a mat construction can be advantageous. However, it is generally preferable to fix the entire surface area of the supporting layers to the fibrous layers by means of an adhesive. This improves the force initiation conditions for the necessary reshaping forces.

The adhesive used for this purpose can be adhesives acting in a thermoplastic manner. However, it is also possible to use contact or solvent adhesives. It is particularly economic and advantageous from the manufacturing standpoint if the supporting layers are precoated with the adhesive used.

The joining together of the supporting layers in punctiform or linear manner according to the invention can take place by known textile aids, e.g., by sewing or stitching. It is more advantageous from the production standpoint if the punctiform or linear interconnection of the supporting layers is brought about by adhesion. In this case, the corresponding joints of the supporting layers are produced by the adhesive used for bringing about the whole-area adhesion of the supporting layer to the fibrous layer. This is the best solution from the production and cost standpoints.

Like the fiber mats made according to the prior art, the fiber mats according to the invention are preferably provided with thermosetting binders and are mainly hot-molded to molded articles. In this case, it is particularly advantageous if the punctiform or linear connections between the individual supporting layers are made in such a way that the connection points or lines are dissolved in the mold heat.

During the closing of the compression mold the connecting points still exercise the hitherto described functions. However, after intense contact with the mold surfaces during the increase in molding pressure, the connecting points dissolve and permit a material exchange in these local areas, so that the connection points or lines can no longer be seen on the finished article. If the supporting layers are joined together by textile processes, the solubility in heat can be brought about by the use of thermoplastic stitching threads. In the case of adhesive joints, the joining strength can be eliminated in the heat by using adhesives whose binding force decreases in the presence of heat.

An important advantage of mats according to the invention is that their deformation characteristics are no longer preponderantly determined by the quality of the fibrous materials used. Thus, e.g., in the prior art mats it is either impossible or possible to a limited extent to concomitantly use production waste, because the fiber length of the waste is reduced during preparation. Addition of treated production waste considerably impairs the deformation characteristics of the mat. In the case of the mats according to the invention, the deformation properties of the supporting layers predominate. Thus, it is possible to use production waste, including processed supporting layers, in the production of mats. This ensures an inexpensive waste-free production and conserves raw materials.

The central layers of these mats are prestrengthened, but in the initial state they have a much lower density than in the molded state. The deformability of the central layers is improved by thermal action, e.g., steam treatment prior to molding. If they are to be adequately deformable, they must have a moisture content above 10%. This is a disadvantage from the molding standpoint, because moisture extraction during the hot final molding process requires additional molding time.

During molding, the moisture content can lead to steam bubble formation, particularly if steam-impermeable supporting layers are used. The perforation of the supporting layers proposed for the purpose of eliminating the disadvantage also fails to completely eliminate the risk of steam bubble formation because the perforated proportion of the overall surface area of the supporting layers is naturally small. Steam bubble formation either leads to an increased quantity of waste material or requires a correspondingly complicated molding procedure to eliminate the steam (intermediate relief of the press during the molding of the final article). These factors reduce the economy of the overall process.

Thus, according to an advantageous further development of the invention, the density of the prestrengthened central layer prior to molding approximately corresponds to its density in the finished article, the moisture level thereof being below 10%.

The low moisture content allows the molding time to be further reduced and prevents the occurence of steam bubbles in the molded article. As the density of the prestrengthened central layer corresponds approximately to that of the finished article, the layer has only a limited tendency to uncontrolled moisture absorption during intermediate storage, so that its preconditioning can be maintained over a relatively long period. Further advantages result from the fact that mats with central layers compressed to this extent are less voluminous and consequently require less storage space. In addition, their handling and transportation stability is considerably improved compared with known mats.

The central layers of mats according to the invention must also have adequate deformability in correspondingly, highly compressed state, which generally requires additional measures. Thus, for example, according to an advantageous embodiment, the central layer of such mats comprises at least one sheet of creped paper or cardboard impregnated with thermoplastic or duroplastic binders. The entire surface area of creped papers, cardboard, woven or non-woven fabrics is uniformly finely folded. Such structures consequently have an overall surface area which is a multiple of that corresponding to the external dimensions of the corresponding webs. They are therefore able to cover the increase in the surface area required for producing the three-dimensional shape from the "stored surface area" of the pleating (creping). In the case of a suitable shape of the creping folds (cross-creping in which the corresponding web is finely folded in two directions at right angles to one another) the corresponding material has a high deformability in all the directions in question. The increase in the surface area is made possible by smoothing the folds, without the material being subject to higher tensile stresses resulting from the deformation. Thus, the creping of the central layer permits the necessary deformation thereof and creped papers which have already reached their final density can be prefabricated and impregnated without difficulty. They can contain pulverulent filler in addition to cellulose fibers.

Textile central layers can also be used for producing mats according to the invention. Thus, for example, it is possible for the central layer to comprise at least one sheet of creped fabric or non-woven fabric impregnated with duroplastic or thermoplastic binders. Here again, the necessary deformability of the central layer is obtained by impregnating the per se inadequately deformable woven or non-woven fabric.

Particularly favorable conditions are provided if adequate deformability is ensured on the basis of the material used for the central layer of the mats. This is for example the case if the central layer is a thermoplastic material filled and/or reinforced preferably with cellulose or lignocellulose materials. Such a mat can be hot-molded without taking special precautions. Particular advantages are obtained in connection with molded article which are to be exposed to thermal stressing in subsequent use if the creped supporting layers are made from metal. This improves both the dimensional stability of the articles in heat and also reduces the heat absorption due to the favorable reflection condition of the supporting layer.

Creped papers, cardboards, fabrics, woven or non-woven fabrics impregnated with binders, as proposed for the central layer material of the mats according to the invention can only be creped in a limited thickness. According to a further development of the inventive principle, it is therefore advantageous to use central layers comprising an interlaminar bond of one or more materials of the described type. The individual sheets of the central can then be joined by sewing, stitching or needling.

This can in particular be advantageous if the individual sheets are formed from paper, cardboard, woven or non-woven fabrics. If textile joining processes are used, it is advantageous for the joining threads to be made from thermoplastic materials, which are readily deformable during hot-molding. A further advantageous possibility of constructing the core layer as an interlaminar bond is brought about by producing the latter by an adhesive which softens in the presence of heat.

This procedure has the advantage that the central layers can be built up in a random thickness from individual layers with good deformation characteristics. The reciprocal joint becomes flexible during hot molding, so that the deformation characteristic of the individual layers can be fully utilized.

Due to the fact that in the interlaminar bond the materials can be combined virtually at random, further adaptation scope is obtained for the characteristics of the molded article.

Central layers according to the invention can be wholly or partly produced from recycled materials. The creped papers or cardboards of the central layers can, for example, be recycled papers or cardboards whose qualities are inadequate for other uses. This also applies to non-woven fabrics or woven fabrics made from synthetic and/or natural fibers. In both cases, the primary products for producing the mats according to the invention can be obtained from the appropriate industry.

It is also possible to produce the central layers from filled and/or reinforced thermoplastic materials using low-grade thermoplastic material waste, such as is e.g., those obtained in the form of coated paper waste cable industry waste and which cannot be used for other purposes. Color differences and impurities do not play an important part in connection with the use according to the invention. Inadequate mechanical strength characteristics, as those which can occur when using mixed waste, can be compensated by a suitable selection of the supporting layers.

The mats according to the invention are produced on the basis of the prior art. The central layer is applied to the lower supporting layer which serves as the conveyor belt. The upper supporting layer is then supplied from a reel and the assembly formed by the supporting layers. The central layer is passed between the pairs of rollers used for prestrengthening and said layers are joined together. The perforations can be obtained by pairs of rollers provided with corresponding needles, which in each case pass through a supporting layer and partly penetrate the central layer.

What is claimed is:

1. A fiber mat for producing three-dimensional molded moldings by means of the dry process comprising:
    a fibrous central layer;
    a pair of supporting layers joined to opposed sides of the central layer, the supporting layers being formed of creped foil material; and wherein
    the form and depth of creping of the supporting layers and the overlapping length of the fibers in the central layer are adjusted with respect to each other such that the local elongation of the creping does not interrupt the central layer.

2. The fiber mat of claim 1 wherein the creping of the supporting layers causes less than 50% elongation of the supporting layers.

3. The fiber mat of claim 1 wherein the form of the creping is configured such that the elongation of the creping and the supporting layers corresponds with one-half of the length of the fibers in the central layer.

4. The fiber mat of claim 1 wherein the creping comprises juxtaposed parallel folds.

5. The fiber mat of claim 1 wherein the creping comprises cross-wise folds.

6. The fiber mat of claim 1 wherein the surfaces of the supporting layers facing the central layer is joined to the latter by adhesion.

7. The fiber mat of claim 1 wherein the supporting layers are joined together in a punctiform manner at equal intervals by sewing through the central layer.

8. The fiber mat of claim 7 wherein punctiform connections are dissolved in heat.

9. The fiber mat of claim 1 wherein the creped supporting layers are provided with perforation.

10. The fiber mat of claim 1 wherein the central layer has a high proportion of short fibers constituted by waste materials and is creped in the same way as the supporting layers.

11. The fiber mat of claim 10 wherein the central layer comprises at least one sheet of paper recovered from paper waste and impregnated with a binder material.

12. The fiber mat of claim 11 wherein the binder is a thermoplastic material.

13. The fiber mat of claim 11 wherein the binder is a duroplastic material.

14. The fiber mat of claim 10 wherein the central layer comprises at least one sheet of creped fabric impregnated with a binder material.

15. The fiber mat of claim 10 wherein the central layer comprises a thermoplastic material filled with cellulose.

16. The fiber mat of claim 10 wherein the central layer comprises a plurality of interconnected layers.

17. The fiber mat of claim 1 wherein the creped, foil material is selected from the group consisting of paper plastic and metal fabric.

18. The fiber mat of claim 1 where the supporting layers are connected to the central layer by means of a bonding agent disposed at predetermined locations between adjacent surfaces of the supporting and central layers, the bonding agent being dissolved during the molding process.

* * * * *